June 27, 1967     R. E. CLARK ETAL     3,327,475

CONTROL SYSTEM FOR HYDROSTATIC TRANSMISSION

Original Filed July 9, 1962     11 Sheets-Sheet 2

*Fig. 2*

MASTER SERVO PISTON AT ZERO SPEED POSITION UNDER NEUTRAL QUADRANT CONTROL

DAVID B. PURYEAR
RICHARD E. CLARK
RICHARD L. CARMON
INVENTORS.

BY Sheldon F. Rojes

ATTORNEY

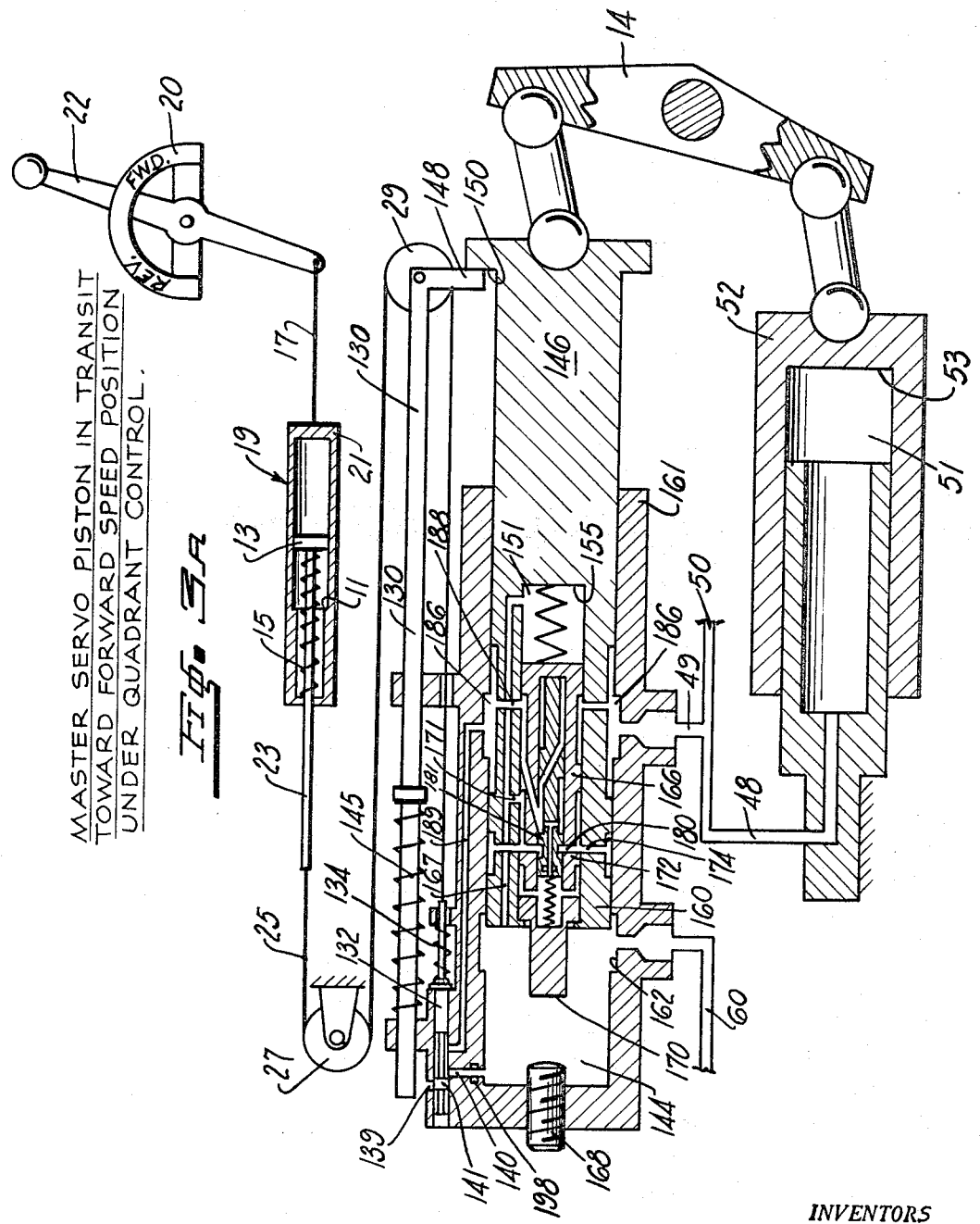

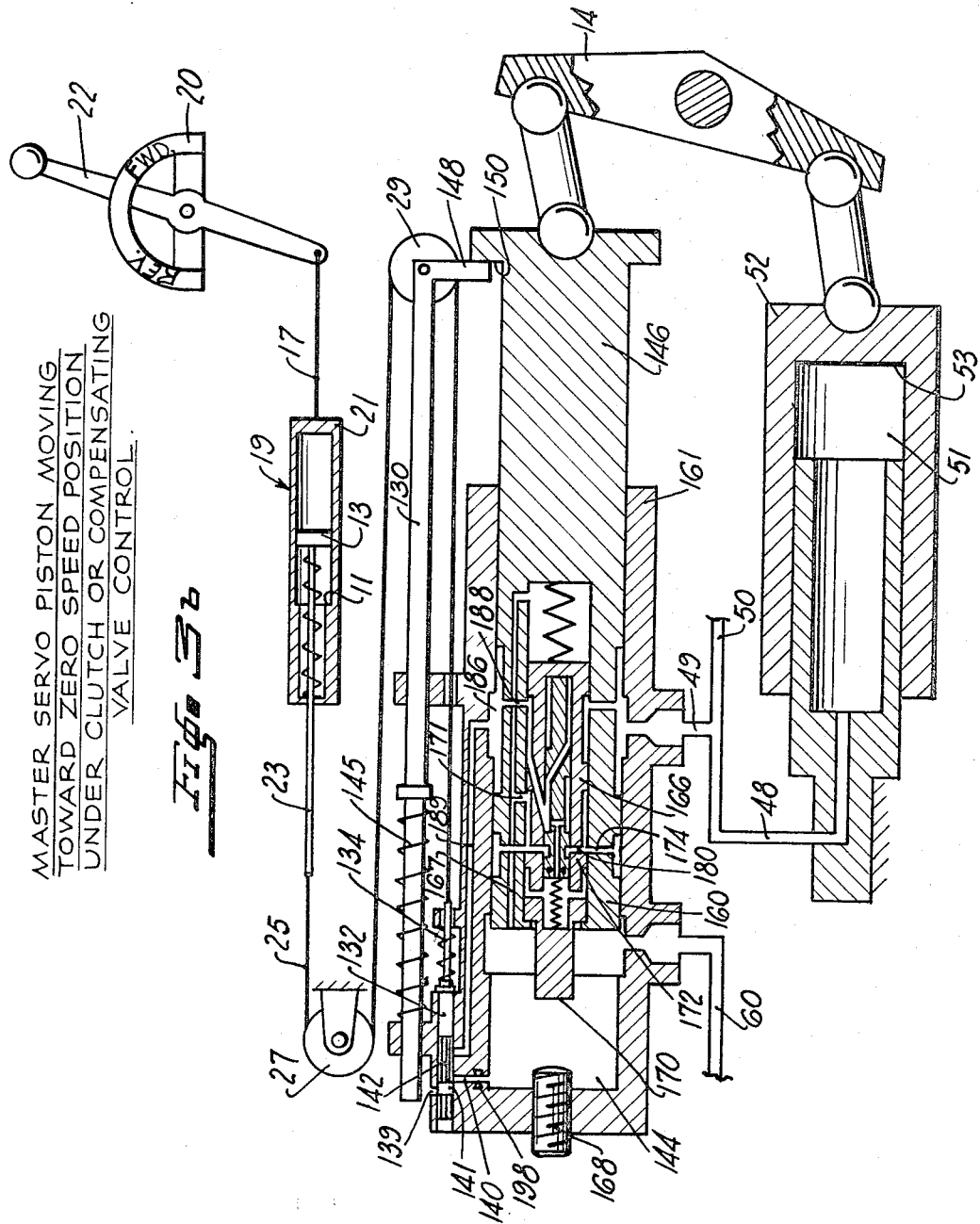

June 27, 1967  R. E. CLARK ETAL  3,327,475
CONTROL SYSTEM FOR HYDROSTATIC TRANSMISSION
Original Filed July 9, 1962  11 Sheets-Sheet 5

MASTER SERVO PISTON AT
ZERO SPEED POSITION UNDER
CLUTCH CONTROL.

Fig. 3c

INVENTORS
DAVID B. PURYEAR.
RICHARD E. CLARK.
RICHARD L. CARMON.
Shelden L. Raies
ATTORNEY.

June 27, 1967  R. E. CLARK ETAL  3,327,475
CONTROL SYSTEM FOR HYDROSTATIC TRANSMISSION
Original Filed July 9, 1962  11 Sheets-Sheet 6

Fig. 4A

MASTER SERVO PISTON IN TRANSIT
TOWARD REVERSE SPEED POSITION
UNDER QUADRANT CONTROL

INVENTORS
DAVID. B. PURYEAR.
RICHARD E. CLARK.
RICHARD L. CARMON
Sheldon F. Raizes
ATTORNEY.

MASTER SERVO PISTON MOVING TOWARD ZERO SPEED POSITION UNDER CLUTCH OR COMPENSATING VALVE CONTROL.

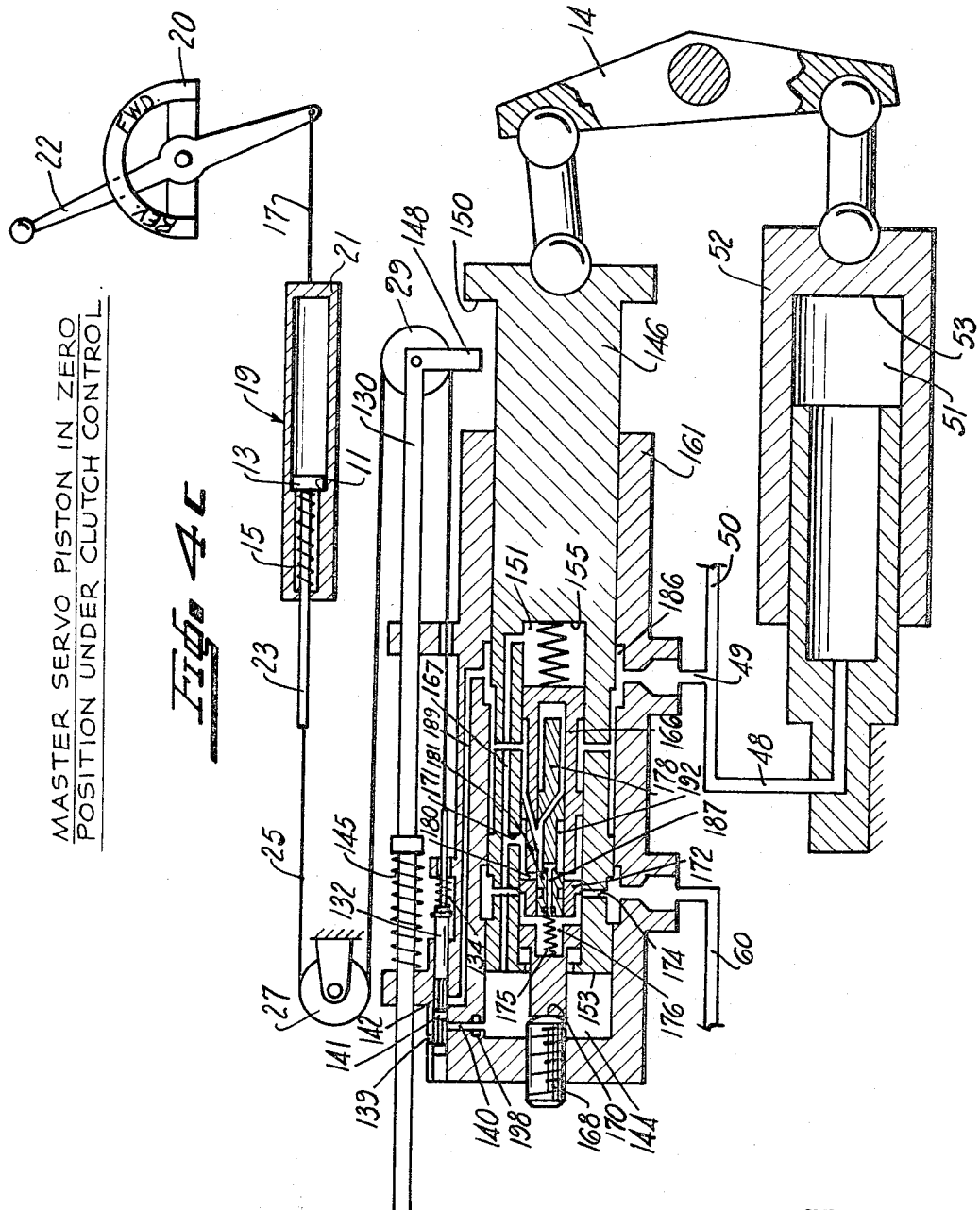

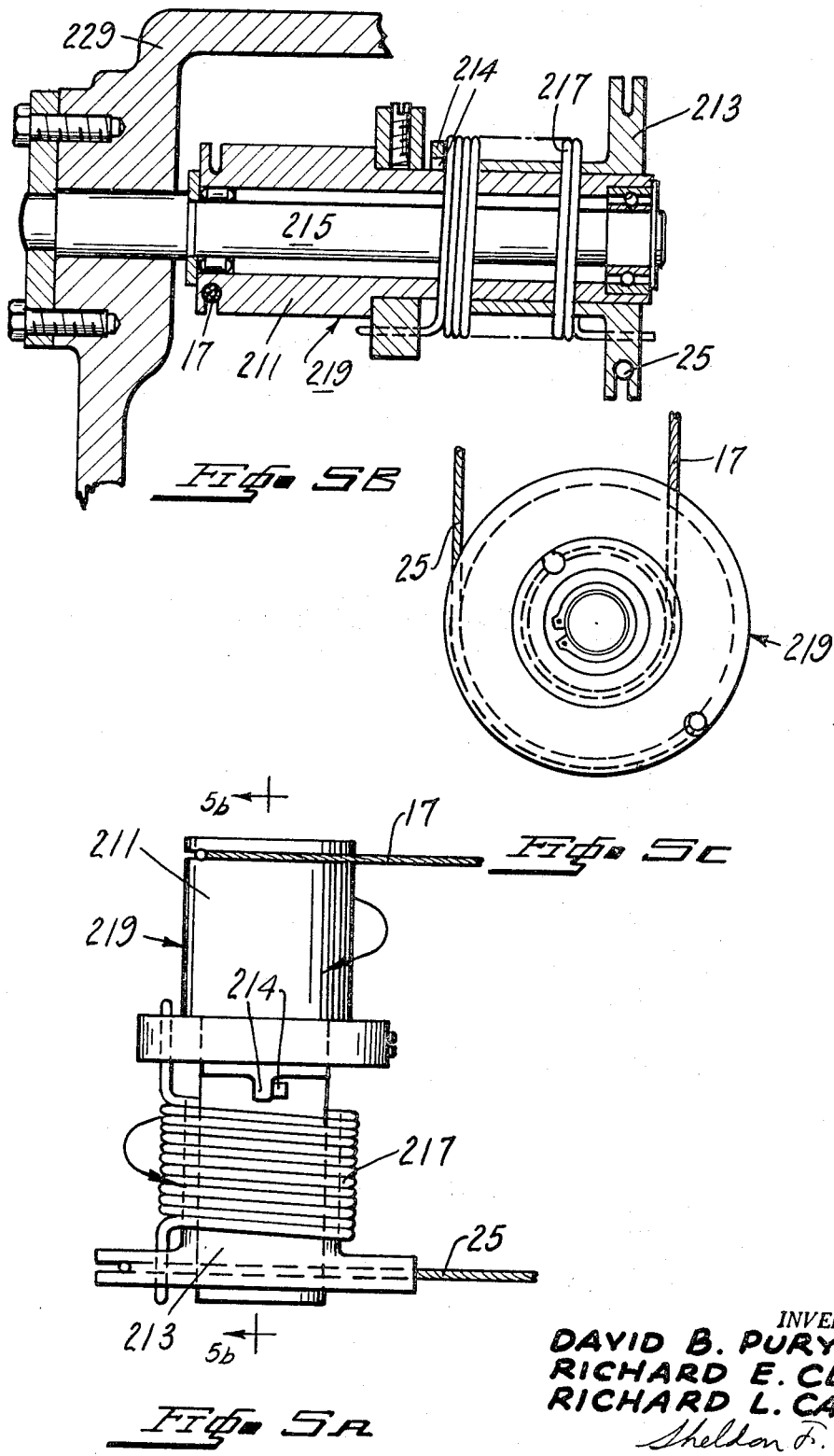

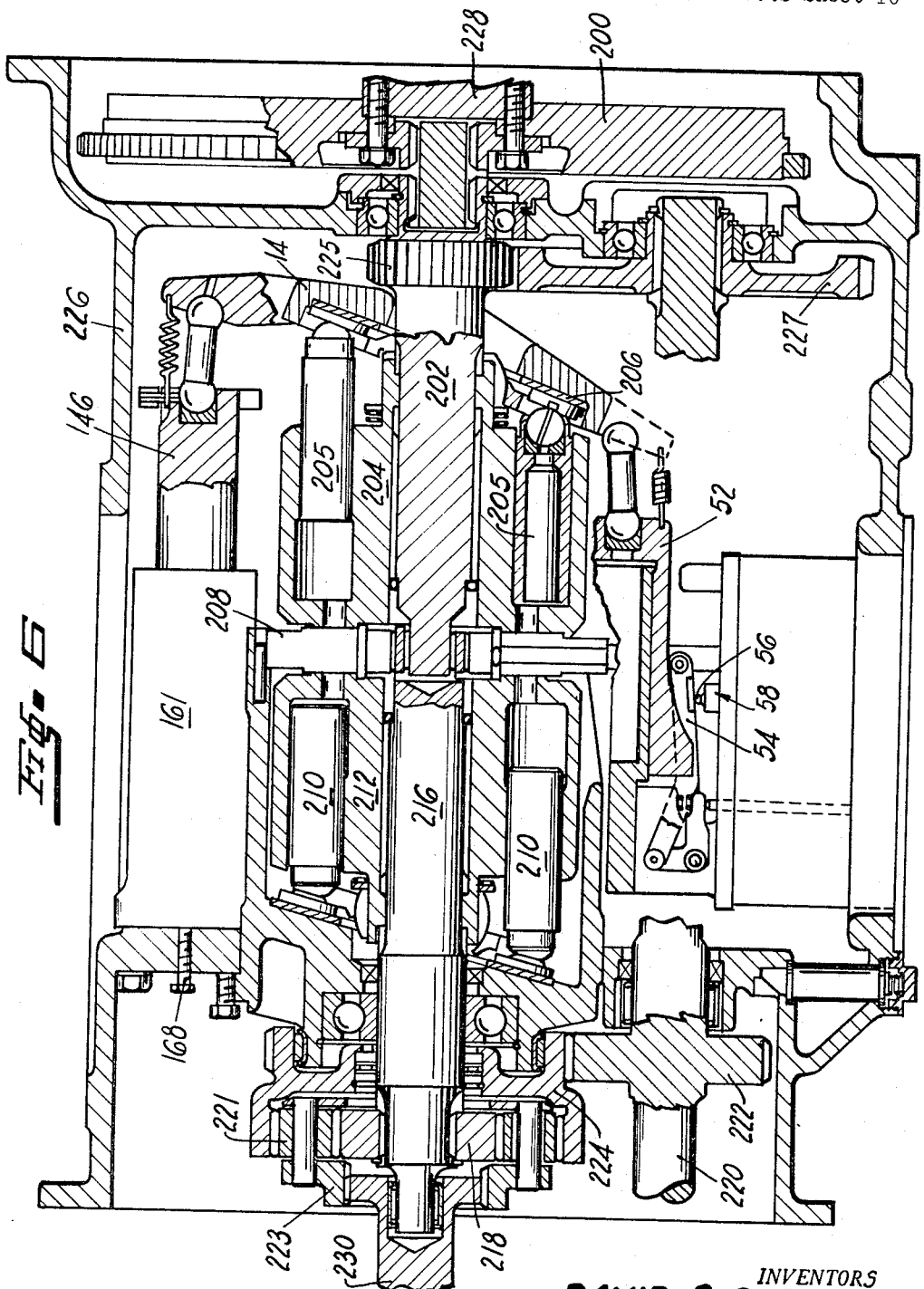

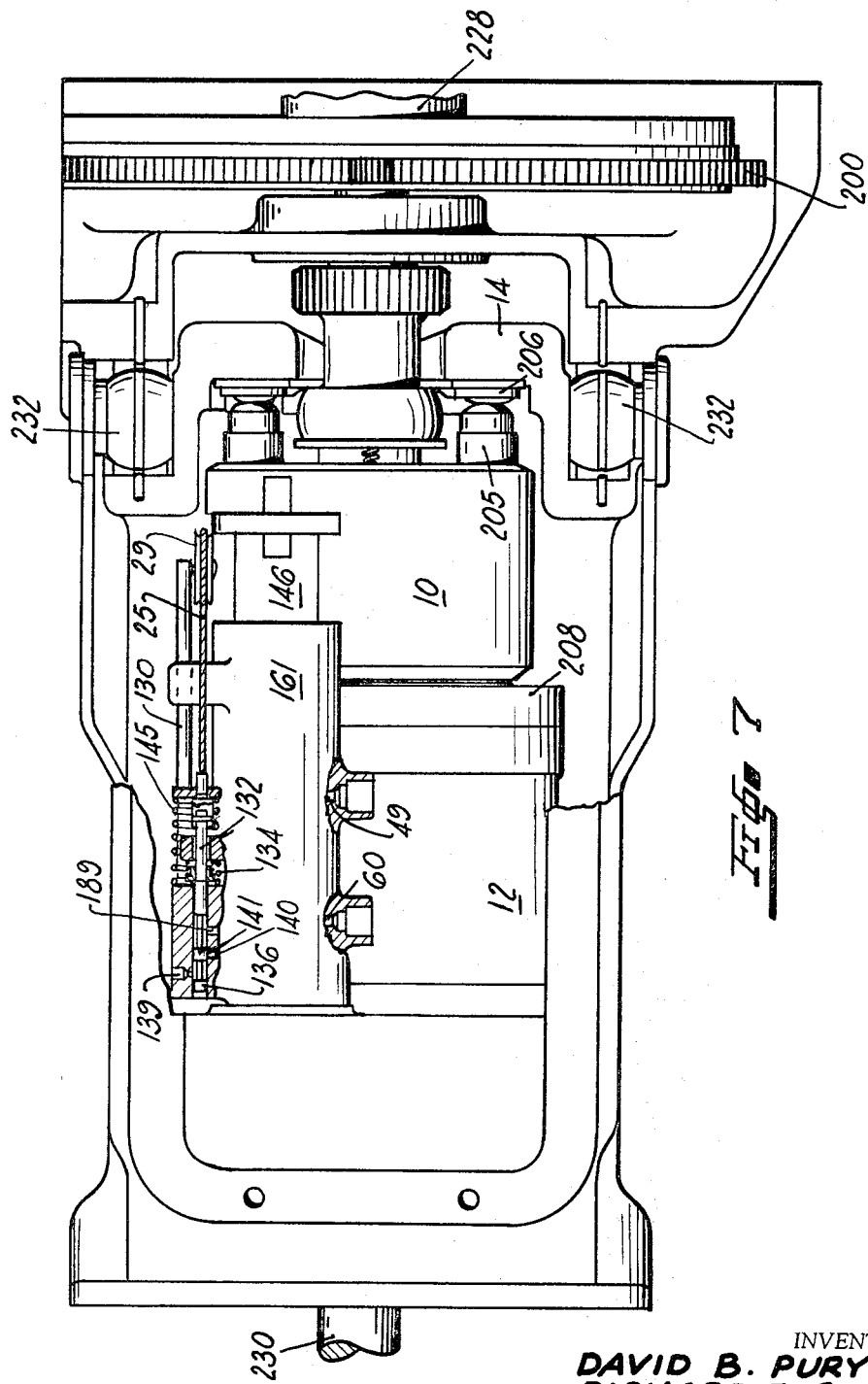

United States Patent Office 3,327,475
Patented June 27, 1967

3,327,475
CONTROL SYSTEM FOR HYDROSTATIC
TRANSMISSION
Richard E. Clark, Ann Arbor, Richard L. Carmon, Birmingham, and David B. Puryear, St. Joseph, Mich., assignors to The Bendix Corporation, St. Joseph, Mich., a corporation of Delaware
Continuation of application Ser. No. 208,437, July 9, 1962. This application Mar. 3, 1966, Ser. No. 531,600
26 Claims. (Cl. 60—52)

This application is a continuation in whole of our co-pending application Ser. No. 208,437, now abandoned, filed on July 9, 1962.

This invention relates to a hydrostatic transmission.

More particularly, this invention relates to a hydrostatic transmission in which a pump and motor are connected in "back-to-back" relationship to form a driving or torque transmitting relationship therebetween and in addition thereto, if desired, suitable mechanical parallel paths are arranged so that actuation of the pump and, if utilized, the mechanical paths by a vehicle engine will effect operation of the motor and the mechanical paths thereby transmit torque to the vehicle wheels.

One of the objects of the invention is to provide a transmission wherein an infinite variation between limits of speed output may be effected with constant engine speed if desired.

Another object is to provide the hydrostatic transmission with a control system which provides the transmission with advantageous features.

Still another object of the invention is to provide the hydrostatic transmission with a control system having means to automatically reduce vehicle speed without stalling the engine should torque become excessive at a given speed setting.

A further object of the invention is to provide a foot or hand operated lever or clutch which is operable by the driver of a vehicle and which is effective to overcome a vehicle speed setting by a lever means to bring the vehicle to rest.

Another object of the invention is to include within the hydrostatic transmission control system means for interconnecting the discharge and intake ports of the pump thereby preventing the pump from transmitting torque should the hydraulic pressure therein become excessive.

A still further object of the invention is to provide valve means in the hydrostatic transmission control system for automatically connecting the discharge port and the intake port of the pump with a high pressure line and a low pressure line, respectively, regardless of what port is the discharge or intake port.

Still a further object of the invention is to provide a follow-up means which is capable of transmitting force from a manual operating lever to an element in the control system with the transmission of force by said follow-up means being instantaneous with the actuation of said lever regardless of the direction of actuation of the lever.

It is an over-all object of the invention to achieve these foregoing objects by means of a simple but effective, reliable combination of controls for hydrostatic transmissions capable of driving the vehicle in reverse or forward direction and which is economically feasible to produce.

Other objects and features of the invention will become apparent from considering the following description which proceeds with reference to the accompanying drawings wherein:

FIGURE 2 is a sectional view illustrating the master servo piston and slave cylinder piston controlling the swash plate of the pump at zero speed position under quadrant control, the lever and follow-up mechanism being shown schematically therewith;

FIGURE 3A illustrates a sectional view of the master servo piston and the slave cylinder piston moving the swash plate of the pump toward a forward speed position under quadrant control, the quadrant lever and follow-up mechanism being schematically shown therewith;

FIGURE 3B is a sectional view illustrating the master servo piston and the slave cylinder piston positions immediately following the opening of the compensating valve by clutch or compensation action while the control lever is in forward position, the quadrant lever and follow-up mechanism being schematically shown therewith;

FIGURE 3C is a sectional view illustrating the master servo piston and the slave cylinder piston maintaining the swash plate of the pump at zero speed position under clutch control with the quadrant lever in forward position, the quadrant lever and follow-up mechanism being schematically shown therewith;

FIGURE 4A is a sectional view illustrating the master servo piston and the slave cylinder piston moving the swash plate of the pump to a reverse position under quadrant control, the quadrant lever and follow-up mechanism being schematically shown therewith;

FIGURE 4C is a sectional view illustrating the master servo piston and the slave cylinder piston maintaining the swash plate of the pump at zero speed position under clutch control with the quadrant lever in reverse position, the quadrant lever and follow-up mechanism being schematically shown therewith;

FIGURE 5A illustrates another embodiment of a tensor utilized in the follow-up mechanism;

FIGURE 5B is a section view taken along line 5B—5B of FIGURE 5A;

FIGURE 5C is a top view of the tensor of FIGURE 5A;

Figure 1:
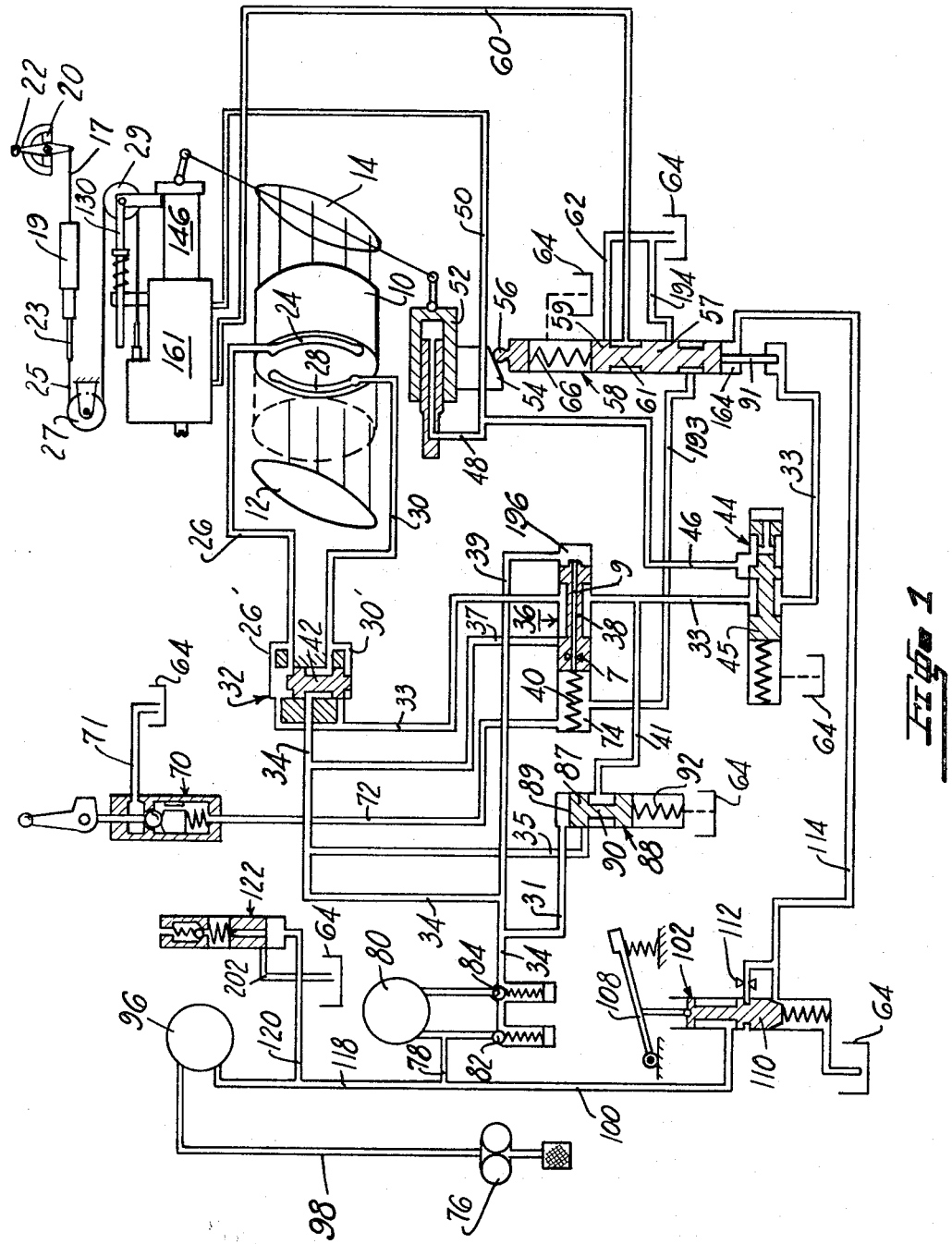
FIGURE 1 is a schematic diagram view of the hydrostatic transmission hydraulic system.

FIGURE 6 is an assembly view of the pump and motor combination which are coupled together back-to-back to perform a power transforming connection between the engine and the wheels and a view of the mechanical path means combining planetary; and FIGURE 7 illustrates the transmission shown in FIGURE 6 viewed from the top and having a part of the casing of the transmission removed to illustrate the pump and motor and a portion of a control system therefor.

Referring to FIGURES 6 and 7, a transmission is housed within a casing 226 and thus located so that an engine power shaft 228 at the end of the transmission is coupled with a back-to-back motor 12 and pump 10 and that power will be ultimately transmitted through the back-to-back motor and pump members to the output shaft 230 at the opposite end of the transmission. This is a conventional arrangement and does not form a part of the present invention. The variable displacement (positive) axial piston pump 10 of the swash plate 14 type and a constant displacement axial piston motor 12 are connected hydraulically to the piston pump 10 through a common valving plate 208. An engine turns flywheel 200 and a power shaft 202 which rotates a pump rotor 204 carrying pistons 205 which reciprocate within the rotor 204 as the rotor is turned. The stroke of the pistons is determined by the angle of the swash plate 14; the pistons being in slidable contact with the swash plate 14 through slippers 206. The output of the pump is then transmitted to the valve plate 208, then to pistons 210 and a rotor 212 of the motor 12 thereby effecting rotation of the motor 12 and rotatably driving the motor shaft 216. The motor output shaft is then coupled to a sun gear 218 of a planetary arrangement which, together with a ring gear 224 drives a series of planetary gears 221 located on a carrier 223. Engine power is split through two parts of the transmission with part of the power used to turn the pump and the remainder mechanically passed through the transmission by gearing. The remaining engine power is transferred to a power take-off shaft 220 and gear 222 through the engine power shaft 228 and the gears 225 and 227 connected to the power shaft 202 and shaft 220, respectively. The power output to shaft 220 is transmitted to the ring gear 224 of the planetary arrangement by gear 222. Total transmission output is transferred to the planetary gears 221 by the sun gear 218 and the ring gear 224. The planetary gears 221 are mounted on the carrier 223 which in turn is positively connected to the output shaft 230 which is connected to a differential. Variable speed is obtained by varying the pump output through changing its swash plate angle and thus varying the motor and sun gear speed.

If desired, part of the power transmitted through shaft 220 may be transmitted on out of the transmission to a power take-off driven device rather than being utilized to drive the ring gear. For example, the power take-off driven device may be a hay chopper or a combine.

Referring to FIGURE 7, the swash plate 14 is supported on a trunnion axis provided by two spaced spherical members 232 which permits pivotal movement of the swash plate 14 about the axis. Also shown in FIGURE 7 is a master servo piston 146 for positioning the swash plate 14 and part of a follow-up mechanism 25, 29 and 130 for regulating the swash plate angle. Other components of the transmission are identified by the reference numerals used in other figures.

While a swash plate type pump has been referred to above, any kind of a reversible variable output pump can be utilized.

Referring to the schematic of the transmission system illustrated in FIGURE 1, a hand lever 22 is pivotally connected to a quadrant 20 and sets the rate of speed of the vehicle. The hand lever 22 acts through a follow-up mechanism 17, 19, 23, 25, 27, 29 and 130 to set the axial position of a master servo piston 146 which in turn fixes the angle of the swash plate.

Referring to FIGURES 3A–4C, a cable 17 is attached at one end to the hand lever 22 and at the other end to a take-up tensor 19 which in turn is attached to another cable 25. Cable 25 wraps around pulley 27 of a fixed rotatable axis and also wraps around pulley 29 of a movable axis of rotation before ending attached to a spring biased servo valve spool 132. A rod 130, carrying pulley 29, is slidably mounted on the fixed housing 161 of the master servo cylinder and is biased toward the right by compression spring 145. The servo valve spool 132 is biased toward the left by compression spring 134.

The take-up tensor 19 comprises an outer tubular sleeve 21 interconnected to a pin 23 slidable therein by a compression spring 15. The force of spring 145 is always greater than the combined forces of springs 134 and 15 and spring 134 is always stronger than spring 15. Assuming the lever is in any position and is moved to a forward position and locked in place, FIGURE 3A, the spring 134 will urge servo valve spool 132 to the left from closed position to forward open position and then spring 15 will take-up the resulting slack, if any, in cables 17 and 25 by spreading the sleeve and pin 21, 23 of the tensor apart. As soon as the master servo piston 146 starts moving toward the right, the spring 145 will urge rod 130 to the right thereby tensioning the cable 25 until flange 13 of slidable pin 23 engages the shoulder 11 of sleeve 21. Further movement of the rod 130 by spring 145 to the right will result in the movement of servo valve spool 132 against the force of spring 134 to the right and back to closed position due to further tensioning of cable 25. The movement of master servo piston 146 is stopped upon servo valve spool 132 reaching closed position.

If the quadrant lever 22 were moved from any position toward reverse, FIGURE 4A, the flange 13 of pin 23 will always be in engagement with the shoulder 11 of sleeve 21. The cable 25 will be tensioned moving servo valve spool 132 to the right from closed position to reverse open position and upon further movement of quadrant 22, rod 130 will be moved to the left compressing spring 145. Master servo piston 146 will move to the left until flange 150 engages the arm 148 of rod 130 and moves rod 130 to the left until compression spring 134 moves servo valve spool 132 to the left back to closed position. Movement of master servo piston 146 will then be stopped.

Another type of take-up tensor which could be used in place of tensor 19 is illustrated in FIGURES 5A, 5B and 5C designated as 219. The tensor comprises two hollow cylindrical members 211 and 213 rotatably mounted on a fixed longitudinal rod 215 which may be mounted to a casing 229 of the transmission. The cylindrical members 211 and 213 each have a lug 214 on the inner ends thereof which are arranged to abut each other. The lugs are biased away from each other and the cylindrical members are biased in opposite rotatable directions by a clock or coil spring 217 connected at one end to member 211 and connected at the other end to member 213. When used in place of the tensor 19, the tensor 219 will have cable 17 attached to element 211 and cable 25 will be attached to element 213. The force of spring 145 is always greater than the combined forces of springs 134 and 217 and spring 134 is always stronger than clock or coil spring 217.

When the lever 22 is moved from any position toward forward position, the spring 134 will urge servo valve spool 132 to the left from closed position to forward open position and then the clock spring 217 will rotate members 211 and 213 in opposite directions as shown by the arrows in FIGURE 5A separating the lugs 214 to take up the resulting slack, if any, in cables 17 and 25. As soon as the master servo piston 146 starts moving toward the right, the spring 145 will urge rod 130 to the right thereby tensioning the cable 25 and rotating element 213 against the force of the spring 217 until the lugs 214 engage each other. Further movement of the rod 130 by spring 145 to the right will result in the movement of servo valve spool 132 against the force of spring 134 to the right and back to closed position due to further tensioning of cable 25.

If the quadrant lever 22 were moved from any position toward reverse, the lugs 214 will always be in engagement with each other. With the operation of the follow-up device being the same as for the tensor 19 when the lever 22 is moved toward reverse position.

It can be seen that tensors 19 and 219 perform the same advantageous function in the follow-up mechanism by providing immediate response by the servo valve spool 132 to the position of lever 22 and at the same time maintaining the cable 25 taut so that it will be retained on pulleys 27 and 29.

It is important, that the follow-up arm 130 have a considerable range of movement, and it is further important that the rate of spring 145 be substantially constant. If it is inconvenient to supply a spring having the necessary constancy of rate over a substantial degree of travel, the spring 145 can be eliminated and hydraulic means substituted in its place for providing a constant but yieldable resistance to movement of the arm 130 toward the left and subsequent return to the right in order to restore the servo valve spool 132 to closed position when the swash plate 14 reaches an angle determined by the quadrant lever 22.

Since the position of the master servo piston 146 may be varied infinitely between limits the swash plate 14 is variable in its angular position through its total range of movement from one extreme angular position to an opposite extreme angular position. It is possible to vary the torque through correspondingly fine degrees of control from the engine to the wheels; such fine degree of adjustment being unattainable with a mechanical tarnsmission.

*Pressure distribution of system*

The pump 10 includes pistons, some of which are on a discharge stroke and others on a suction stroke during rotation of the pump. The discharging pistons are connected through a kindney-shaped outlet port 24 with line 26 and the pistons on their suction stroke are connected through a kidney-shaped opening 28 to line 30. A supercharge pump 76 is connected to the kidney-shaped opening 28 by way of a heat exchanger 96, line 118, line 78, filter 80, line 34, replenishing valve 32, and line 30 to produce pressure for assisting in urging the pistons in the pump 10 to the retracted position and re-establish fluid which has been lost through leakage. The pressure supplied to the kidney-shaped port associated with the suction stroke of the pistons will hereinafter be referred to as "low pressure." The pressure being discharged through the kidney-shaped port associated with the pistons on their discharge stroke will hereinafter be referred to as "high pressure."

When the transmission is operating normally, the pressures are distributed among the system illustrated in FIGURE 1 as follows: Low pressure—line 98, heat exchanger 96, line 118, line 78, filter 80, line 34, through replenishing valve 32 to line 30 and port 28; line 31 leads from line 34 to the top face 89 of spool member 90; line 35 leads from line 34 to the land 87 of spool member 90 of bypass valve 88; line 37 leads from line 34 to land 7 of spool 38 of high pressure relief valve 36; line 39 leads from line 34 to chamber 196 at one end of the spool member 38 of relief valve 36 and the chamber 196 is communicated through restricted passage 9 to chamber 74 of high pressure relief valve 36 and line 72 leads from chamber 74 to a clutch lockout valve 70; line 193 leads from chamber 74 of high pressure relieve valve 36 to the chamber of the compensating valve 58; line 100 leads from line 118 to the clutch valve 102; and line 120 leads from line 118 to the low pressure relief valve 122.

High pressure—kidney-shaped opening 24, line 26, replenishing valve 32 line 33 through the high pressure relief valve 36 through the pressure reducing valve 44 to the stem 91 of the compensating valve 58; and line 41 leads from line 33 to the by-pass valve 88. Servo pressure —conduit 46 is communicated with the high pressure line 33 through pressure reducing valve 44 until a maximum value of pressure is reached at which time the spool 45 moves to the left against the force of the spring acting on the left end of the spool to close off communication between lines 46 and 33. The pressure in line 46 will hereinafter be referred to as "servo pressure." Servo pressure is communicated by line 46 to line 48 to the slave piston 52 and is further communicated to the master servo cylinder 161 by line 50. Line 62, reservoir 64 and lines 114, 202 and 71 do not have pressure therein since they normally lead to the reservoir 64 except when line 114 is communicated to low pressure line 100 during clutch operation.

*Operation of master servo piston under control of quadrant lever*

Referring to FIGURES 1–4C, a slave piston 52 has pressure from line 50 acting on face 53 which is equal to about one-half the area of faces 153 and 155 of master servo piston 146. Chambers 144 and 151 of the master servo cylinder and piston are communicated to each other through longitudinal passage 167. When the swash plate is in set position the pressure in chambers 144 and 151 is approximately equal to one-half the servo pressure in chamber 51. Servo pressure from line 50 is connected to the chamber 51 by line 48 and is connected to chamber 142 of the master cylinder housing 161 by line 49 of annular groove 186 in the housing and longitudinal passage 189. When the lever 22 is moved toward reverse speed position the servo valve spool 132 will move to the right from closed to reverse open position allowing land 141 to communicate chambers 144 and 151 through a restricted passage 140 with the port 139 leading to the reservoir. Consequently, the slave piston 52 will have a greater force biasing it to the right than master servo piston 146 has and the master servo piston 146 will move toward the left. If the lever 22 is moved toward forward position, then the servo valve spool 132 will move toward the left from closed to forward open position so land 141 will communicate chambers 144 and 151 through a restricted passage 140 with chamber 142. Since the areas 153 and 151 together are about twice as large as area 53 of slave piston 52, a slight increase of pressure to over one-half servo pressure in chambers 144 and 151 will produce more force biasing the piston 146 to the right than the force acting to the right on the slave piston 52 and therefore master servo piston 146 will move to the right. It should be understood that the master servo piston 146 will move to the left or right until it reaches its set position at which time the servo valve spool moves back to its cloesd position with land 141 covering passage 140 but allowing slight bleed of passage 140 to reservoir port 139 and equal bleed from chamber 142 to passage 140; the net result being no flow into or out of chambers 144 and 151.

*Compensating valve*

The purpose of the compensating valve is to control the combination of torque output and the speed of the transmission to insure that the torque output remains within the capacity of the engine output so that the engine will not be stalled. This is accomplished by reducing vehicle speed when additional load is imposed on the vehicle and then restoring the vehicle speed in accordance with a setting of lever 22 when the load is reduced. The pressure to line 33 is related to the torque output. The advantages of this system to a farmer, in the case of the vehicle being a tractor, is immediate. The tractor can be set for a given speed which is appropriate to various farming functions such as seeding, cultivating, plowing, etc., and the tractor will continue up and down the field at the selected speed, slowing only momentarily at such times as a temporary added load is imposed and then resuming the preselected speed.

Referring to FIGURE 1 the compensating valve 58 operates to connect line 60 and therefore the master servo cylinder housing 161 to the reservoir 64 through line 62. Slave cylinder piston 52 has a cam surface 54 mounted thereon which engages a nob 56, slidably held in the bore of valve 58, which engages a spring 66 which in turn engages a spool 61. The position of the slave cylinder piston 52 and therefore the angle of the swash plate and the speed of the vehicle is sensed by the spring 66 through nob 56 and cam surface 54. The pressure in line 33 is related to the torque or load output. If a load on the vehicle is such that the pressure in line 33 is excessive of the value that the load of the spring 66 allows due to the speed of the vehicle, the high pressure will act on stem 191 of the spool 61 raising the spool upwardly against the spring 66 with land 59 communicating line 60 to the reservoir through line 62. When line 60 is communicated with line 62, the effect thereof is to move the master servo piston 146, swash plate 14 and slave cylinder piston 52 to a lower speed position defined at the point where the cam surface 54 and knob 56 compresses the spring 66 to counterbalance the excess pressure in line 33. The land 59 will then throttle the fluid from line 60 passing to the reservoir until the pressure in line 33 reduces to its former value, at which time the compensating valve 58 closes and the swash plate 14, master servo piston 146 and slave piston 52 returns to their lever set position. If the load of the vehicle is such that the pressure in line 33 rises more rapidly than the response of the servo piston 146 can reduce the swash plate angle through action of land 59 opening line 60 to reservoir and is of such excessive value as to bias spool 61 upwardly against the force of spring 66 so that land 57 uncovers line 194 to communicate low pressure line 193 with reservoir 64, chamber 74 of valve 36 will be dumped to the reservoir 64 resulting in the low pressure in chamber 196 of valve 36 moving spool 38 to the left against the spring force 40 and communicating the high pressure line 33 with the low pressure line 37. This will result in reduced or zero flow being put out by the pump 10 depending on the degree of opening of valve 36. A reduction of flow of the pump will result in reducing speed of the vehicle and the torque output of the pump and motor combination. Upon return of the spool 61 to its normal position, land 57 will cut off communication between the reservoir 64 and line 193 and pressure will build up in chamber 74 resulting in the spring 40 moving the spool 38 to the right disestablishing communication between the low pressure line 37 and high pressure line 33; the pump 10 then being able to produce the same amount of flow and therefore the pump and motor combination will transmit the same torque output once again. Note that cam surface 54 will compress spring 56 more at a low vehicle speed setting than at a high vehicle speed setting. Therefore, less output is permitted the transmission at high vehicle speed than at low vehicle speed.

The manner in which the master servo piston 146 and slave cylinder piston 52 reduce the angle of swash plate 14 to reduce the output of the pump and therefore the speed of the vehicle when the compensating valve 58 communicates line 60 with the reservoir 64 is the same as when the clutch 108 is operated, which will be fully explained hereinafter.

*Clutch lockout valve*

A clutch lockout valve is used when starting the engine or when it is desired to stop the vehicle for a long period while running the engine.

The clutch lockout valve 70 which can be either mechanically, hydraulically or electrically operated is connected through line 72 to chamber 74 of the relief valve 36. When the lockout valve 70 is operated, pressure in the chamber 74 is dumped to the reservoir 64 and the spool 38 is moved to the left interconnecting the high pressure line 33 with the low pressure line 37 thereby preventing torque output from the pump-motor.

*Clutch operation*

A clutch may be used to rapidly stop the vehicle without interference from the engine power. Gradual depression of the clutch pedal feathers pressure into the chamber 164 under the compensating valve which allows fine control of vehicle motion for implement hook-up, etc.

When the quadrant lever 22 is moved to any forward or reverse speed position on the quadrant 20 and a clutch pedal 108 is depressed, the high and low pressure kidney ports 24 and 28 are interconnected preventing transmission of torque and the pistons 52 and 146 are brought to a zero speed setting thereby returning the swash plate 14 to zero speed position; the clutch pedal control 108 overriding the setting for the pistons 52 and 146 is provided by the quadrant lever 22. This is accomplished in a manner as shown in FIGURES 3B and 3C, wherein the quadrant lever 22 is in forward position and the land 160 communicates chamber 144 through the groove 162 to line 60. Thus, as the valve 110 is depressed by clutch 108 (FIGURE 1), the pressure from line 100 is communicated past the choke orifice 112 to line 114 and to chamber 164 thereby raising the compensating valve 58 and communicating lines 60 and 193 through lines 62 and 194, respectively, to the reservoir 64. The net effect of this sequence is to dump pressure from chamber 74 thereby permitting spool 38 to move to the left and interconnect lines 33 and 37 and to dump pressure from chamber 144 leaving an unbalance force between the slave cylinder piston 52 and the piston 146 in favor of the former. The slave cylinder piston 52 travels to the right moving the swash plate 14 to a zero speed position, carrying the piston 146 leftwardly, and at the same time moves rod 130 and pulley 29 to the left, through flange 150 and arm 148, and slackens cable 25 allowing spring 134 to move the servo valve 132 to the left. The servo pressure in line 50 will either remain the same or drop depending upon the pressure in line 33 when the high and low pressure ports are interconnected. If the pressure in line 33 drops below the normal servo pressure then the servo pressure will drop to the same value. If the pressure in line 33 drops but still remains above the normal servo pressure then the servo pressure remains at normal or its limiting value. For illustrative purposes only, it will be assumed that the servo pressure drops below normal. Land 141 of the servo valve 132 will communicate servo pressure line 50 with a restricted passage 140 and chamber 144 through groove 186, radial passage 188 of piston 146, longitudinal passage 189, and chamber 142. When the outer end 170 of spool valve 166 engages an adjustable stop 168 (FIGURE 3C) and the land 160 moves leftwardly past groove 162 to prevent access from chamber 144 directly to the groove 162, further movement of fluid out of chamber 144 must thereafter pass through passage 167 and 171 of the piston 146, radial passage 180 of piston 146, radial passage 174 of spool 166, thence to groove 162 in line 60. The piston 146 moves leftwardly until it reaches a zero speed setting (FIGURE 3C) at which time land 172 restricts passage 174 thereby restricting further fluid outlet from chamber 144 so the inflow of fluid to chamber 144 from chamber 142 and the outflow of fluid from chamber 144 is balanced. The forces on the piston 146 and slave cylinder piston 52 are then balanced with the pressure in chamber 144 being one-half servo pressure. Operation of the clutch does not of course disturb the forward speed setting of the quadrant lever 22 so that the servo valve 132 will continue to shunt fluid under pressure to chamber 144 in an attempt to restore the swash plate 14 to its forward position. When the clutch pedal 108 is released, fluid pressure will build up in chamber 74 allowing spring 40 to bias valve spool 38 into normal position to cut off the high pressure port 24 from the low pressure port 28 whereby the high pressure in line 33 will build up and servo pressure in line 50 will build up to normal. Line 114 will be communicated to the reservoir 64 enabling spring 66 to return compensating valve 58 to close line 60, thereby building up pressure in chamber 144 which produces a force acting to move piston 146 to the right which is greater than the force acting to move the slave cylinder piston 52 to the right. The piston 146 will then move toward the right restoring the swash plate 14 to its forward set position. The follow-up rod 30 has an arm 148 biased by spring 145 against flange 150 to follow the movement of master servo piston 146 to the right and upon reaching the proper set position will pull servo valve 132 to the right to closed position with land 141 closing off communication between chambers 142 and 144 and providing slight bleeding between restricted passage 140 and port 139 and between chamber 142 and restricted passage 140. The pressure in chamber 144 will then be one-half the servo pressure in the slave cylinder piston and therefore the forces acting to move pistons 146 and 52 to the right will be equalized resulting in restoring the swash plate 14 to its forward set position (FIGURE 3A).

Figure 4B:
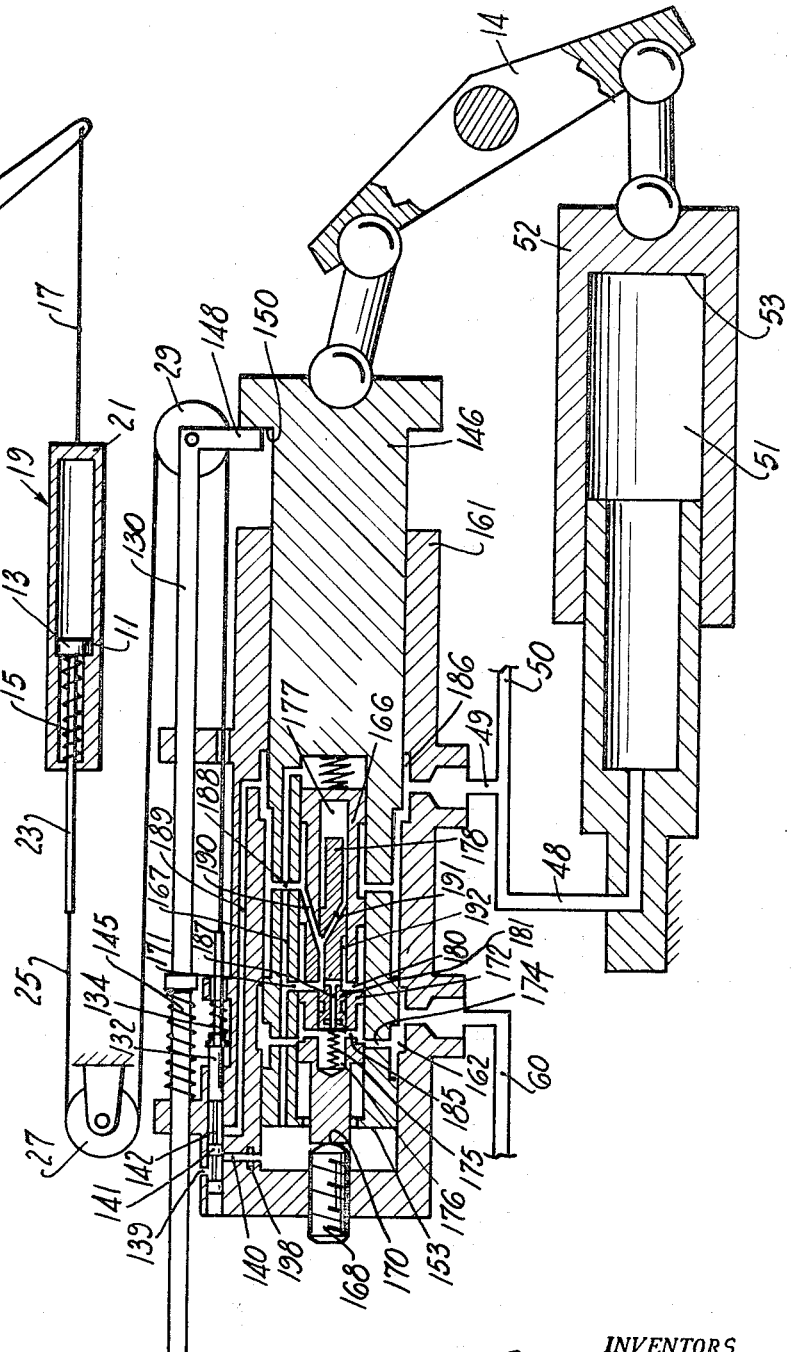
FIGURE 4B is a sectional view illustrating the master servo piston and the slave cylinder piston positions immediately following the opening of the compensating valve by clutch or compensation action while the quadrant lever is in reverse position, the quadrant lever and follow-up mechanism being schematically shown therewith.

Referring to FIGURES 4B and 4C, assuming that the quadrant lever 22 is pulled to the left to reverse position the piston 146 is in the position shown in FIGURE 4B. When the clutch pedal is operated, the servo pressure in line 50 drops to less than normal and fluid is dumped from line 60. Fluid pressure in chamber 176 drops to reservoir pressure and the small inner spool 178 is biased leftwardly under fluid pressure in chamber 177. Servo pressure is communicated through line 50, groove 186 longitudinal passage 189 to chamber 142 and is communicated through passages 188, 190 to restricted passage 187. The restricted passage 187 communicates with chamber 176, passages 185, 174, groove 162 and line 60, all of which are under zero pressure in compensating valve open position. Servo pressure is conveyed to the chamber 177 through diagonal passage 190, chamber 192, and diagonal passage 191. Servo pressure is then free to communicate from chamber 192 through radial passage 180 and radial passage 171 to longitudinal passage 167 and into chamber 144 building up the pressure in chamber 144 to slightly higher than one-half servo pressure thereby causing an unbalance of forces which results in biasing the piston 146 toward the right and moving the swash plate 14 to a zero speed setting and overriding the position of the swash plate dictated by the reverse speed setting of the quadrant lever 22. As the piston 146 moves toward the right from the position shown in FIGURE 4B to zero speed position shown in FIGURE 4C, the land 172 will come into line contact with the radial passage 174 thereby throttling communication of chamber 176 with passage 174 and bleed line 60. The pressure communicated to chamber 176 through restricted passage 187 of inner spool 178 builds up to slightly less than servo pressure and the pressure within chamber 176 and spring 175 act on the end of the inner spool 178 against the servo pressure acting on the opposite end of the spool 178 to move the spool toward the right wherein the servo pressure from chamber 192 is throttled at radial passage 180 by land 181 of spool 178 resulting in a drop in pressure in chamber 144 to a pressure of approximately one-half servo pressure. The degree of throttling fluid is balanced against the loss of fluid from chamber 144 through restriction 198 and past land 141 to the reservoir, the control valve 132 having been drawn to the right of its closed position when the spring 145 moved follow-up rod 130 to the right in at attempt to follow flange 150. When the clutch is released, the compensating valve 58 returns to close off line 60 from the reservoir line 62 and pressure builds up to servo pressure in chamber 176 wherein the pressure exerted on each end of the inner spool 178 is equal, resulting in the spring 175 pushing the inner spool 178 to the right against the end of the outer spool 166 thereby cutting off communication of servo pressure with the chamber 144. The servo pressure will act to move slave cylinder piston 52 to the right until flange 150 strikes follow-up arm 148 thereby slackening cable 25 which permits spring 134 to move servo valve spool 132 to the left and back to neutral position with land 141 covering passage 140 and disestablishing all but a very slight leakage communication of the chamber 144 with port 139 leading to the reservoir. The swash plate 14 is now back in its reverse position dictated by the quadrant lever 22 setting (FIGURE 4A).

Stop 168 is adjustable by reason of its connection to the housing 161 and can therefore be adjusted to set outer spool 166 relative to the inner spool 178 and piston 146 to effect a zero speed setting for the valve system within master servo cylinder 161. In this manner creep of the vehicle can be avoided by simply adjusting the stop 168 until the vehicle reaches stationary condition when the clutch is actuated.

The difference between actuation of the compensating valve 58 by excessive pressure in line 33 or by clutch 108, insofar as the effect on the operation of the servo piston 146, slave cylinder piston 52 and swash plate 14 is concerned, is that excessive pressure causes the swash plate 14 to be moved toward zero position only while such pressure in line 33 exists, while in clutch operation, it is intended to keep the pedal 108 actuated so that the swash plate 14 will reach a zero speed setting unless the clutch is being used in relation to the aforesaid implement hookup. Also, when the compensating valve is actuated by the pressure in line 33, the pressure in line 60 normally will not drop to reservoir pressure because the compensating valve spool land 59 normally throttles the flow of fluid from line 60 to line 62. However, the pressure in line 60 will drop to reservoir pressure if the pressure in line 33 moves the spool 61 so that land 59 fully uncovers the opening to line 62.

Filter check valves

Two check valves 82 and 84 are associated with the filter 80. The check valve 82 operates to allow fluid to by-pass the filter if the filter becomes clogged and the check valve 84 prevents surges from high pressure lines due to sluggishness of valves or other causes from entering filter and filter case.

Low pressure relief valve

Low pressure relief valve 122 operates to dump excess flow to the reservoir 64 through line 202 if the low pressure exceeds a certain value.

By-pass valve

A by-pass valve 88 operates to prevent the low pressure from falling below a certain value and causing cavitation of the pump. If the low pressure acting on face 89 of spool 90 falls below a certain value, spring 92 will bias the spool 90 upwardly and communicate the high pressure line 41 with the low pressure line 35 to maintain the pressure in the low pressure line at a certain minimum value.

Replenishing valve

The suction and discharge ports of the pump 10 interchange depending on the direction of torque output of shaft 216. A replenishing valve 32 insures that whichever of the two lines 26 or 30 is at the higher pressure (connected to the discharge port) is connected to line 33 and whichever of the two lines is at a lower pressure (connected to the intake port) is connected to low pressure line 34. As illustrated in FIGURE 1, there is a greater pressure acting through line 26' on the spool 42 than the pressure acting in line 30' acting against spool 42 resulting in line 33 being connected with line 26. If the high pressure line were line 30, then there would be a greater pressure in line 30' acting against spool 42 than the pressure in line 26' acting against 42 and the spool would be biased upwardly connecting line 26 with low pressure line 34 and connecting line 30 with high pressure line 33.

Other revisions of the invention or variations will become apparent to those skilled in the art and will suggest themselves from specific applications of the invention. It is intended that such variations and revisions of the invention as are reasonably to be expected on the part of those skilled in the art to suit individual design preference and which incorporate the herein disclosed principles will be included within the scope of the following claims as equivalents thereof.

What is claimed is:

1. In a hydrostatic transmission comprising: a variable output pump having output control means, fluid actuated means operatively connected to said control means for moving said control means thereby setting the output of said pump, valve means, conduit means connecting said valve means with said fluid actuated means, said valve means in open position communicating said conduit means with a lower pressure source and cutting off said conduit means from said lower pressure source when in normal position, means for actuating said valve means into open position, and means changing the position of said control means and said fluid actuated means from a preset position thereby varying the output of said pump from a preset amount when said valve means is opened.

2. The structure as recited in claim 1 wherein said last named means restores the output of said pump to said preset amount when said valve means returns to normal position.

3. In a hydrostatic transmission comprising: a variable output pump having output control means, fluid actuated means operatively connected to said control means for moving said control means thereby setting the output of said pump, lever means, first valve means including valve means operatively connected to said lever means for conducting fluid to and from said fluid actuated means for moving said fluid actuated means and said control means to a position dictated by a lever position on actuation of said lever, compensating valve means, conduit means connecting said first valve means to said compensating valve means, said compensating valve means in open position communicating said conduit means with a lower pressure source and cutting off said last named communication when in normal position, means for actuating said compensating valve means to open position, said first valve means being responsive to the opening of said compensating valve means for conducting fluid to and from said fluid actuated means to vary the output of said pump from a preset amount set by said lever means by movement of said fluid actuated means and said control means.

4. The structure as recited in claim 3 wherein said first valve means conducts fluid to and from said fluid actuated means to restore the output of said pump to the amount set by said lever means when said compensating valve means cuts off communication of said conduit means and said lower pressure source.

5. The structure as recited in claim 1 further comprising: second conduit means communicating fluid output pressure of said pump to said valve means, said means for actuating said valve means to open position being the output pressure, means operatively connected to said fluid actuated means and output control means for sensing the position thereof, said last named means being effectively connected to said valve means to prevent opening thereof by said output pressure until said output pressure reaches a value which is in accordance with the position of said fluid actuated means and said output control means.

6. The structure as recited in claim 5 further comprising: relief valve means for communicating the pump output port with the pump input port when the output pressure exceeds a value determined by said varying force producing means and cutting off said communication in normal position, said first named valve means comprising means for maintaining said relief valve means in normal position when the output pressure of said pump is below the value limit determined by said varying force producing means and opening said relief valve means when said pump output exceeds said value limit.

7. The structure as recited in claim 3 further comprising: varying force producing means normally maintaining said compensating valve means in said normal position, the magnitude of the force of said varying force producing means depending on the position of said fluid actuated means and said control means, means operatively connected to said varying force producing means for sensing the position of said fluid actuated means and said control means, second conduit means communicating fluid output pressure of said pump to said compensating valve means, said means for actuating said compensating valve means to open position being the output pressure when it overcomes said varying force producing means, said force producing means normally being of a greater magnitude than the output pressure of said pump.

8. The structure as recited in claim 7 further comprising: followup means, said lever means being operatively connected to said fluid actuated means by said followup means, said followup means being so constructed as to transmit instantaneously movement of said lever means to said fluid actuated means.

9. The structure as recited in claim 5 wherein: said compensating valve means comprises a housing having a spool member slidable therein, said means preventing opening of said valve means in accordance with the value of the output pressure comprising varying force producing means acting on one end of said spool, said sensing means comprising a cam operatively connected to said fluid actuated means and a cam follower operatively connected to said force producing means and engaging said cam, said cam varying the force of said force producing means depending on the position of said fluid actuated means and said control means, said force producing means normally being of a greater magnitude than the output pressure of said pump and normally maintaining said slidable spool member in normal position.

10. The structure as recited in claim 7 wherein said compensating valve means comprises: a housing having a spool member slidable therein, said varying force producing means acting on one end of said spool, said means for sensing the position of said fluid actuated means and said control means comprising a cam operatively connected to said fluid actuated means and a cam follower operatively connected to said force producing means and engaging said cam, said cam varying the force of said force producing means depending on the position of said fluid actuated means and said control means, said second conduit means communicating fluid output pressure of said pump to the other end of said spool.

11. The structure as recited in claim 10 further comprising: followup means, said lever means being operatively connected to said fluid actuated means by said followup means, said followup means being so constructed as to transmit instantaneously movement of said lever means to said fluid actuated means.

12. The structure as recited in claim 7 wherein: said fluid actuated means comprises at least two surfaces, each of said surfaces being communicated to said first named conduit means, said two surfaces being disposed that when fluid pressure acts thereon, the force on one surface will tend to move said control means by said actuated means in one direction and the force on the other surface will tend to move said control means by said actuated means in the opposite direction, said first valve means being communicated to said surfaces for causing unbalance of said forces on actuation of said lever means until said control means has reached a position dictated by a lever means set position, said first valve means being responsive to communication of said first named conduit means with said lower pressure source, when the output pressure overcomes said force producing means and opens said compensating valve means, for unbalancing said forces acting on said fluid actuating means in one direction to vary the output of said pump from that set by said lever means.

13. The structure as recited in claim 10 wherein: said fluid actuated means comprises at least two surfaces, each of said surfaces being communicated to said first named conduit means, said two surfaces being disposed so that when fluid pressure acts thereon, the force on one surface will tend to move said control means by said actuated means in one direction and the force on the other surface will tend to move said control by said actuated means in the opposite direction, said first valve means being communicated to said surfaces for causing unbalance of said forces on actuation of said lever means until said control means has reached a position dictated by a lever means set position, said first valve means being responsive to communication of said first named conduit means with said lower pressure source, when the output pressure overcomes said force producing means and opens said compensating valve means, for unbalancing said forces acting on said fluid actuating means in one direction to vary the output of said pump from that set by said lever means and being responsive to unbalance said forces acting on said actuating means in the opposite direction to restore the output of said pump to the amount set by said lever means when said compensating valve means cuts off communication of said first named conduit means and said lower pressure source.

14. In a hydrostatic transmission comprising: a variable output fluid pump having output control means, fluid actuated means operatively connected to said control means for moving said control means thereby setting the output of said pump, said fluid actuated means having at least two surfaces, lever means, servo valve means operatively connected to said lever means and responsive to actuation of said lever means, means communicating one of said surfaces to a first conduit means, said conduit means leading to the other of said surfaces, said servo valve means being so constructed that when it is in open position it permits the flow of fluid to said other surface when said lever means is moved in one direction and permits the flow of fluid away from said other surface when said lever is moved in the opposite direction, one of said surfaces being of greater area than the other of said surfaces, said two surfaces being disposed so that when fluid pressure acts thereon the force on one surface will tend to move said control means by said fluid actuated means in one direction and the force on the other surface will tend to move said control means by said fluid actuated means in the opposite direction, followup means for closing said servo valve means upon said control means reaching a position set by said lever means, compensating valve means, varying force producing means normally maintaining said compensating valve means in normal position, the magnitude of the force of said force producing means depending on the position of said fluid actuated means and said control means, means operatively connected to said varying force producing means for sensing the position of said fluid actuated means and said control means, second conduit means communicating fluid output pressure of said pump to said compensating valve means, said force producing means normally being of a greater magnitude than said output pressure of said pump, said fluid actuated means further including valve means, third conduit means communicating said valve means of said fluid actuated means with said compensating valve means, said compensating valve means establishing communication of said third conduit means with a lower pressure source when in open position and cutting off communication of said third conduit means with said lower pressure source when in normal position, said valve means of said fluid actuated means and said servo valve means being responsive to communication of said third conduit means with said lower pressure source when said outlet pressure overcomes said force producing means and opens said compensating valve means causing unbalance of said forces acting on said fluid actuated means in one direction to vary the output of said pump from that set by said lever means by movement of said fluid actuated means and said control means.

15. The structure as recited in claim 14 wherein said lever means is operatively connected to said servo valve means by said followup means.

16. The structure as recited in claim 14 further comprising: relief valve means for communicating the pump output port with the pump input port when the output pressure exceeds a value determined by said varying force producing means and cutting off said communication in normal position, said compensating valve means comprising means for maintaining said relief valve means in normal position when the output pressure of said pump is below the value limit determined by said varying force producing means and opening said relief valve means when the pump output pressure exceeds said value limit.

17. The structure as recited in claim 14 wherein: said compensating valve means comprises a housing having a spool member slidable therein, said varying force producing means acting on one end of said spool, said sensing means comprising a cam operatively connected to said fluid actuated means and a cam follower operatively connected to said force producing means and engaging said cam, said cam varying the force of said force producing means depending on the position of said fluid actuated means and said control means, said second conduit means communicating the fluid output pressure of said pump to the other end of said spool, said valve means of said fluid actuated means and said servo valve means being responsive to restore the output of said pump to the amount set by said lever means when said compensating valve means cuts off communication of said third conduit means and said lower pressure source.

18. The structure as recited in claim 1 further comprising: relief valve means for communicating the pump outlet with the pump input port when in open position and cutting off said communication when in normal position, conduit means communicating said relief valve with said first mentioned valve means, said first mentioned valve means comprising means for maintaining said relief valve means in normal position and in open position.

19. In a hydrostatic transmission system comprising: a variable output pump having intake and discharge ports and output control means, fluid actuated means operatively connected to said control means for moving said control means thereby setting the output of said pump, compensating valve means, means communicated to and responsive to one position of said valve means for varying the output of said pump from a preset amount by movement of said fluid actuated means and said control means, relief valve means communicated to said compensating valve means and said intake and discharge ports, said relief valve means being responsive to a second position of said compensating valve means for interconnecting the discharge and intake ports of said pump, means urging said compensating valve means in a normal position, said compensating valve means being responsive to a first pressure value in said system for movement to said first position and responsive to a second pressure value in said system which is greater than said first pressure value for movement to said second position.

20. The structure as recited in claim 19 wherein said compensating valve is responsive to discharge pressure.

21. The structure as recited in claim 5, wherein said position changing means restores the output of said pump to said preset amount when said compensating valve means cuts off communication of said second conduit means and said lower pressure source.

22. The structure as recited in claim 7, wherein said first valve means conducts fluid to and from said fluid actuated means to restore the output of said pump to the amount set by said lever means when said compensating valve means cuts off communication of said second conduit means and said lower pressure source.

23. The structure as recited in claim 12 wherein said first valve means causes unbalancing of said forces acting on said fluid actuated means in the opposite direction to restore the output of said pump to the amount set by said lever means when said compensating valve means cuts off communication of said first conduit means and said lower pressure source.

24. The structure as recited in claim 14 wherein said valve means of said fluid actuated means and said servo valve means cause unbalancing of said forces acting on said fluid actuated means in the opposite direction to restore the output of said pump to the amount set by said lever means when said compensating valve means cuts off communication of said third conduit means and said lower pressure source.

25. In a hydrostatic transmission comprising: lever means, a variable output fluid pump having output control means, fluid actuated means operatively connected to said control means for moving said control means thereby setting the output of said pump, said fluid actuated means having at least two surfaces, first chamber means for one of said surfaces, second chamber means for the other of said surfaces, a pressure source, first conduit means for communicating each of said chambers with said pressure source, said two surfaces being disposed that when fluid pressure acts thereon the force on one surface will tend to move said control means by said actuated means in one direction and the force on the other surface will tend to move said control means by said actuated means in the opposite direction, first valve means in said first conduit means controlling the flow of fluid to and from said first chamber means, followup means, said first valve means being operatively connected to said lever means and said control means for communicating flow to said first chamber means on actuation of said lever means until said control means has reached a position dictated by a lever means set position, compensating valve means, second conduit means communicating said compensating valve means to said first valve means and said first chamber, said compensating valve means establishing communication of said second conduit means with a lower pressure source when in open position and cutting off communication of said second conduit means with said lower pressure source when in normal position, means for opening said compensating valve means, means changing the position of said control means and said fluid actuated means from a preset position thereby varying the output of said pump from a preset amount when said compensating valve means is opened, said followup means being responsive to movement of said output control means allowing said first valve means to communicate flow to said second conduit means upon movement of said output control means when said compensating valve means is opened and after said compensating valve means moves back to its normal position until said output control means moves back to its preset condition, whereby upon return of said compensating valve means to normal position, pressure will build up in said first chamber means to return said output control means to its preset position.

26. The structure as recited in claim 25 further comprising: third conduit means communicating fluid output pressure of said pump to said compensating valve means, said means for opening said compensating valve means being the output pressure of said pump, means operatively connected to said fluid actuated means and output control means for sensing the position thereof, said last named means being effectively connected to said compensating valve means to prevent opening thereof by said output pressure until the output pressure reaches a value which is in accordance with the position of said output control means.

References Cited
UNITED STATES PATENTS

| | | | |
|---|---|---|---|
| 2,931,176 | 4/1960 | Bloch | 60—52 |
| 2,945,449 | 7/1960 | Le Febvre | 60—52 |
| 2,976,685 | 3/1961 | Thoma | 60—53 |
| 3,003,309 | 10/1961 | Bowers | 60—19 |
| 3,017,750 | 1/1962 | Kempson | 60—52 |
| 3,053,043 | 9/1962 | Knowler | 60—6 |
| 3,163,115 | 12/1964 | Neff | 103—38 |

DONLEY J. STOCKING, *Primary Examiner.*

LAURENCE V. EFNER, WILLIAM L. FREEH,
*Examiners.*